United States Patent Office

3,789,004
Patented Jan. 29, 1974

3,789,004
SOLVENT COMPOSITIONS
Ian McMillan and Jeffrey Prest, Runcorn, England, assignors to Imperial Chemical Industries Limited, London, England
No Drawing. Filed June 28, 1971, Ser. No. 157,735
Int. Cl. C11d 7/50
U.S. Cl. 252—171                                              2 Claims

ABSTRACT OF THE DISCLOSURE

A solvent composition which comprises a mixture of trichlorotrifluoroethane, ethanol and acetonitrile, which mixture forms an azeotrope.

---

This invention relates to a cleaning composition comprising trichlorotrifluoroethane.

It is known that 1,1,2-trichloro-1,2,2-trifluoroethane, on account of its selective solvent power, is useful as a cleaning liquid for the removal of contaminants from a variety of articles and materials, particularly synthetic organic polymers and plastics which are themselves sensitive to other more common and more powerful solvents, such as trichloroethylene or perchloroethylene. However the use of 1,1,2-trichloro-1,2,2-trifluoroethane on its own is often insufficient to remove some of the more persistent forms of contamination, for example various active resin-based soldering fluxes. Some improvement in the efficiency of removal of such persistent contamination may be effected by the use of mechanical aids, for example boiling solvent or ultrasonic irradiation, but use of these mechanical aids is not always sufficient to remove all of the contamination.

We have now found that an improved cleaning fluid may be made which comprises a mixture of trichlorotrifluoroethane with ethanol and acetonitrile.

We have also found that the components of this mixture form an azeotrope.

Thus according to the invention there is provided a solvent composition which comprises a mixture of trichlorotrifluoroethane with ethanol and acetonitrile.

Preferably, the mixture is one having a boiling point within 0.5° C. of the boiling point of the azeotrope, more particularly within 0.2° C. of the boiling point of the azeotrope although mixtures having boiling points within 1° C. and even within 2° C. of the boiling point of the azeotrope may be suitable particularly for use where larger variations in the composition are not critical. Generally, the composition comprises at least 75% by weight of trichlorotrifluoroethane.

It is particularly preferred that the composition comprises the azeotropic mixture. The azeotropic mixture of the preferred isomer, 1,1,2-trichloro-1,2,2-trifluoroethane, contains about 3% by weight of ethanol and about 3% by weight of acetonitrile and has a boiling point at 760 mm. Hg of 43.45° C.

The cleaning composition of the invention will remove some contaminants which are not removed by 1,1,2-trichloro-1,2,2-trifluoroethane alone. In processes which use a cleaning fluid, it is usually necessary from time to time to remove contamination from the liquid by distillation. Such distillations will normally be repeated many times during the useful life of the fluid and if the cleaning fluid consists of two different liquids having different boiling points these distillations will tend to result in a concentration of one of the liquids and a change of the composition in the cleaning bath. Such a change of composition will cause a change in the solvent power of the cleaning fluid and may result in damage to the articles being cleaned or in the production of a dangerously inflammable mixture. However, by use of essentially azeotropic mixtures it is possible to avoid any risk of such undesirable consequences, since the azeotropic mixture can be distilled without preferential concentration of one of the components.

Compositions according to the invention have the advantage that they provide a range of solvents which have a greater solvent power than 1,1,2-trichloro-1,2,2-trifluoroethane while still retaining to a great extent the inertness of 1,1,2-trichloro-1,2,2-trifluoroethane to synthetic organic polymers, plastics, resins, resin laminates, resin-bonded paper board, Bakelite, fibreglass and like materials.

Because of this enhanced solvent power the use of time-consuming, costly and sometimes unacceptable mechanical devices, such as hand-scrubbing or wiping which may cause damage to sensitive articles, may be avoided.

The azeotropic mixture may be used in most of the normal applications of 1,1,2-trichloro-1,2,2-trifluoroethane provided that the increased solvent power of the azeotrope is not a hindrance to such an application. This increased solvent power may make it possible to shorten the cleaning cycles which are at present necessary with pure 1,1,2-trichloro-1,2,2-trifluoroethane and thus enable the capacity of existing plant to be increased.

The compositions of the invention may be used in conventional apparatus and employing conventional operating techniques. The solvent may be used without heat if desired, but the cleaning action of the solvent may be assisted by conventional means, for example use of boiling solvent, agitation or adjuvants.

In some applications it is advantageous to use ultrasonic irradiation in combination with the solvents. This is particularly true when removing certain tenacious fluxes from soldered joints, the ultrasonic irradiation helping to remove the solid and insoluble constituents of the flux.

The high stability of the solvent composition of the invention, and particularly of the azeotrope, under operating conditions makes it usually unnecessary to use stabilizers in the solvents. This has the advantage that when the solvent composition evaporates it leaves a perfectly clean surface uncontaminated with higher boiling stabilizers. However, it is possible that stabilizers may be necessary under corrosive conditions for example those in which the solvent comes into contact with oxidizing agents which can attack the components of the composition.

Other solvents or additives may be added to the solvent composition of the invention if it is desired to modify their cleaning or solvent power. Suitable additives include cationic, anionic and non-ionic detergents. Water may also be added in some circumstances, particularly when the compositions include a detergent, but this is not essential.

Solvent compositions according to our invention, and particularly the azeotrope, are useful in a wide range of applications, including removal of soldering fluxes from electrical equipment, in particular from equipment in which the composition is likely to come into contact with materials such as plastics or resins and cleaning of photographic film or magnetic recording tapes.

The invention is illustrated in the following examples in which all percentages are by weight:

Example 1

Pure 1,1,2-trichloro-1,2,2-trifluoroethane was mixed with ethanol and the mixture distilled through a vacuum jacketed column at high reflux ratio to obtain a constant boiling mixture. A small quantity of acetonitrile was added whereupon it was observed that the condensation and boiling temperatures reached a minimum. The difference between these temperatures also reached a minimum at this point. The composition of the liquid in the ebulliometer was then close to that of a ternary azeotrope. The azeotropic composition was defined more precisely by careful fractionation of a liquid of roughly azeotropic composition followed by analysis of the condensate by gas chromatography. The boiling point of the azeotrope was found by distilling it in a differential ebulliometer and measuring the condensation temperature relative to that of pure 1,1,2-trichloro-1,2,2-trifluoroethane using an ebullioscopic Beckman thermometer.

The azeotrope was found to have a composition of about 94% of 1,1,2-trichloro-1,2,2-trifluoroethane, about 3% of ethanol and about 3% of acetonitrile and a boiling point at 760 mm. Hg of 43.45° C.

The azeotrope was also found to be nonflammable by the Pensky-Martens closed cup test.

Example 2

The azeotropic mixture of Example 1 was tested for its effectiveness in removing a soldering flux from resin-bonded printed circuit boards. A section of board was painted with a commercially-available flux sold under the trade name "Multicore PC25." The board was dried under infrared heating for 2 minutes and then touch-soldered for 5 seconds with solder maintained at 250° C. The board was then immersed in boiling solvent for 1 minute, after which time it was removed and found to be free from all flux residues. For the purposes of comparison a section of board was similarly treated and immersed in "Arklone L," a commercially-available solvent used for circuit-board cleaning, which is an azeotropic mixture comprising 97% of 1,2-trichloro-1,2,2-trifluoroethane and 3% of isopropanol. Extensive flux residues still remained on the board after removal from this solvent.

We claim:

1. An azeotropic composition consisting essentially of about 94% by weight of 1,1,2 - trichloro-1,2,2-trifluoroethane, about 3% by weight of ethanol and about 3% by weight of acetonitrile said composition having a boiling point of about 43.5° C. at a pressure of about 760 mm. Hg.

2. A method of cleaning an article comprising contacting said article with an azeotropic composition as claimed in claim 1.

References Cited

UNITED STATES PATENTS

| | | | |
|---|---|---|---|
| 3,553,142 | 1/1971 | Figiel et al. | 252—Dig. 9 |
| 2,503,119 | 4/1950 | McKinnis | 252—Dig. 9 |
| 3,265,747 | 8/1966 | Cormang et al. | 252—171 |
| 3,640,884 | 2/1972 | Schofield et al. | 252—171 |

WILLIAM E. SCHULZ, Primary Examiner

U.S. Cl. X.R.

252—67, Dig. 9; 260—652. 5

UNITED STATES PATENT OFFICE
CERTIFICATE OF CORRECTION

Patent No. 3,789,004            Dated  January 29, 1974

Inventor(s)   IAN McMILLAN and JEFFREY PREST

It is certified that error appears in the above-identified patent and that said Letters Patent are hereby corrected as shown below:

Please add the following to the front page format after the serial number:

--Claims priority, application Great Britain,
    July 7, 1970, 32948/70--

Signed and sealed this 10th day of September 1974.

(SEAL)
Attest:

McCOY M. GIBSON, JR.
Attesting Officer

C. MARSHALL DANN
Commissioner of Patents